United States Patent [19]

Yakubek et al.

[11] 3,776,348

[45] Dec. 4, 1973

[54] GLASS MAKING MACHINERY

[75] Inventors: Louis P. Yakubek; George R. Obenshain, both of Perrysburg, Ohio

[73] Assignee: Owens-Illinois, Inc., Toledo, Ohio

[22] Filed: Oct. 22, 1970

[21] Appl. No.: 82,987

[52] U.S. Cl. ............................................. 198/131
[51] Int. Cl. .............................................. B65g 15/00
[58] Field of Search .................... 198/131, 177, 34, 198/162

[56] References Cited
UNITED STATES PATENTS

| | | | |
|---|---|---|---|
| 2,177,982 | 10/1939 | Hannon | 198/131 UX |
| 2,166,776 | 7/1939 | Von Hofe et al. | 198/162 |
| 3,310,152 | 3/1967 | Elford | 198/131 X |
| 3,142,374 | 7/1964 | Carter | 198/34 X |
| 2,374,131 | 4/1943 | Powell | 198/162 |
| 928,172 | 7/1909 | Bernardine | 198/131 X |

Primary Examiner—Richard E. Aegerter
Assistant Examiner—Douglas D. Watts
Attorney—J. R. Nelson and E. J. Holler

[57] ABSTRACT

A glass making machine and particularly a heat treat machine wherein open-ended hollow glass articles are supported on carriages moved in an endless path by a conveyor. Each carriage pivotally supports a plurality of heads which, in turn, rotatably support the hollow glass articles. The conveyor moves the carriages and in turn the articles through a plurality of work zones of heat treatment including heating, quenching and cooling zones. As the articles are moved through a work zone, the supports on the heads are rotated to rotate the articles.

57 Claims, 31 Drawing Figures

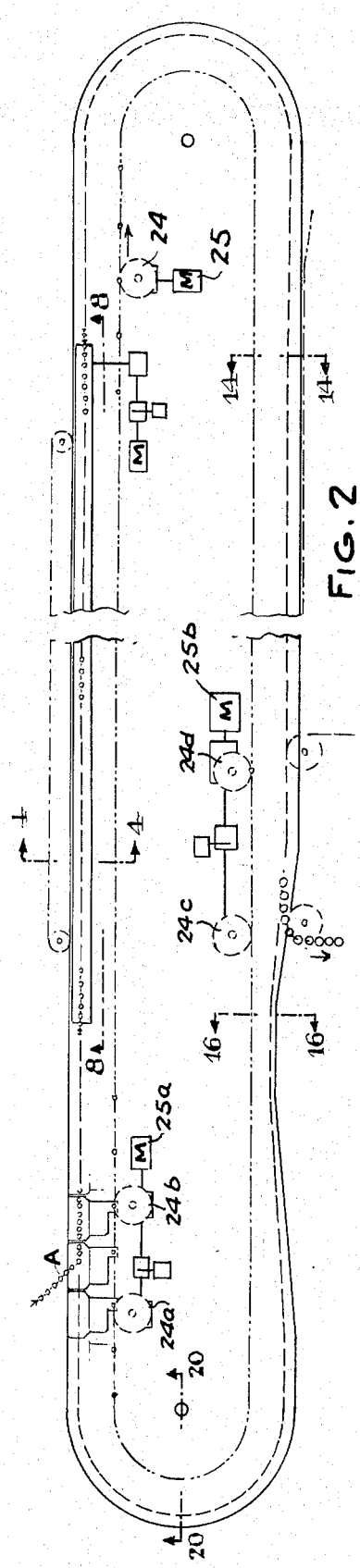
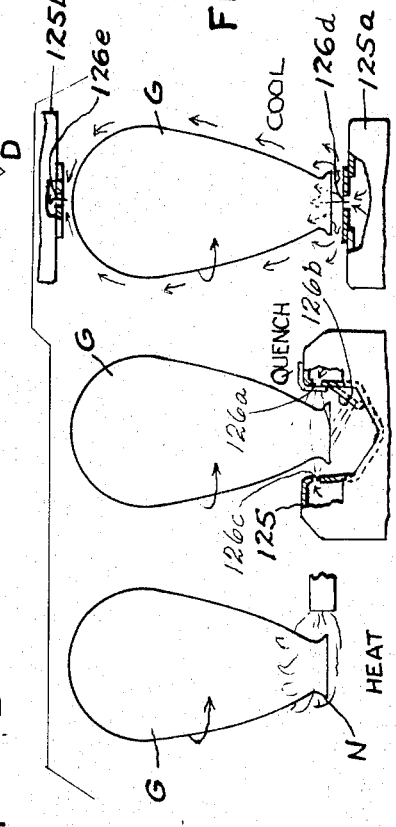

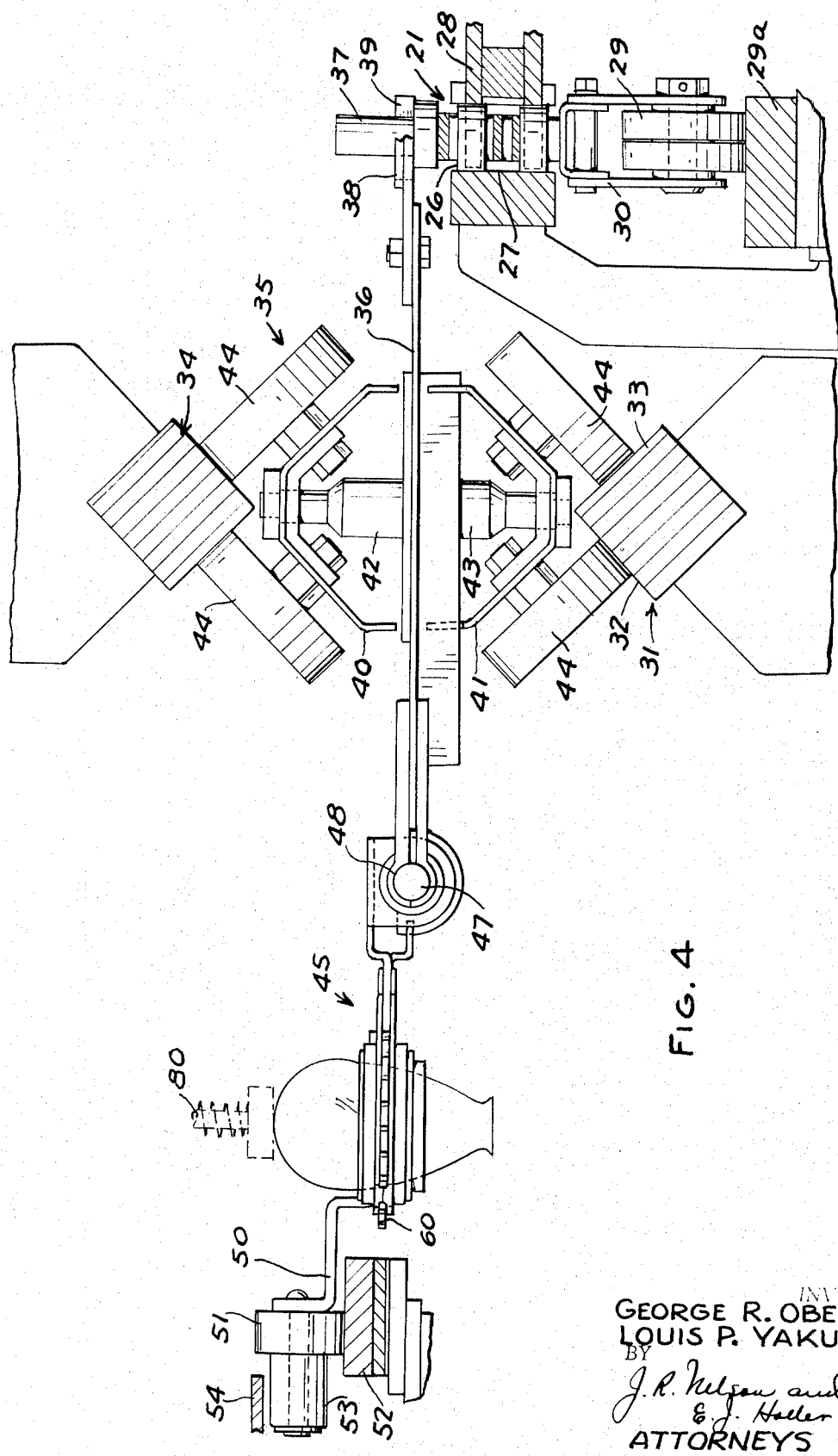

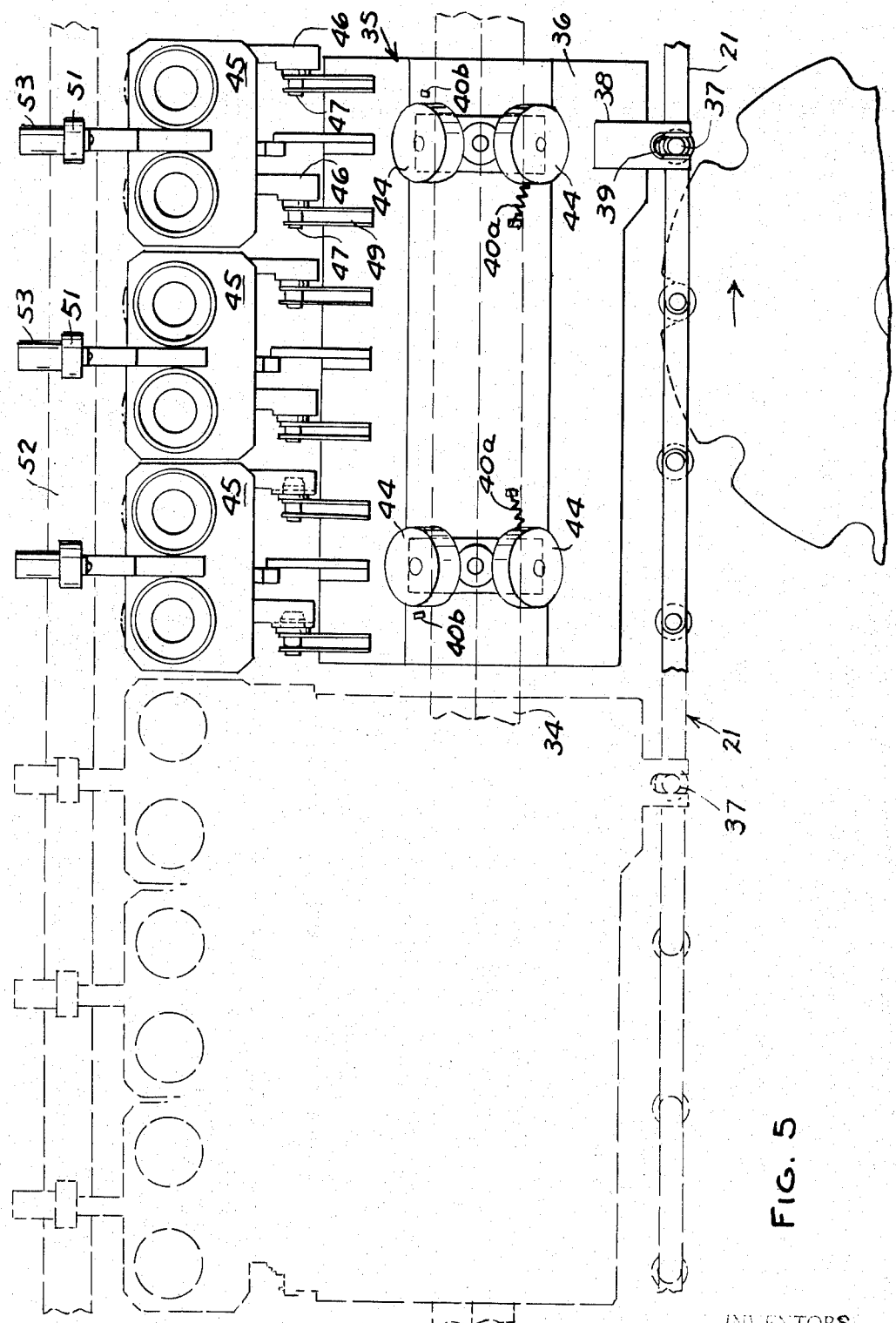

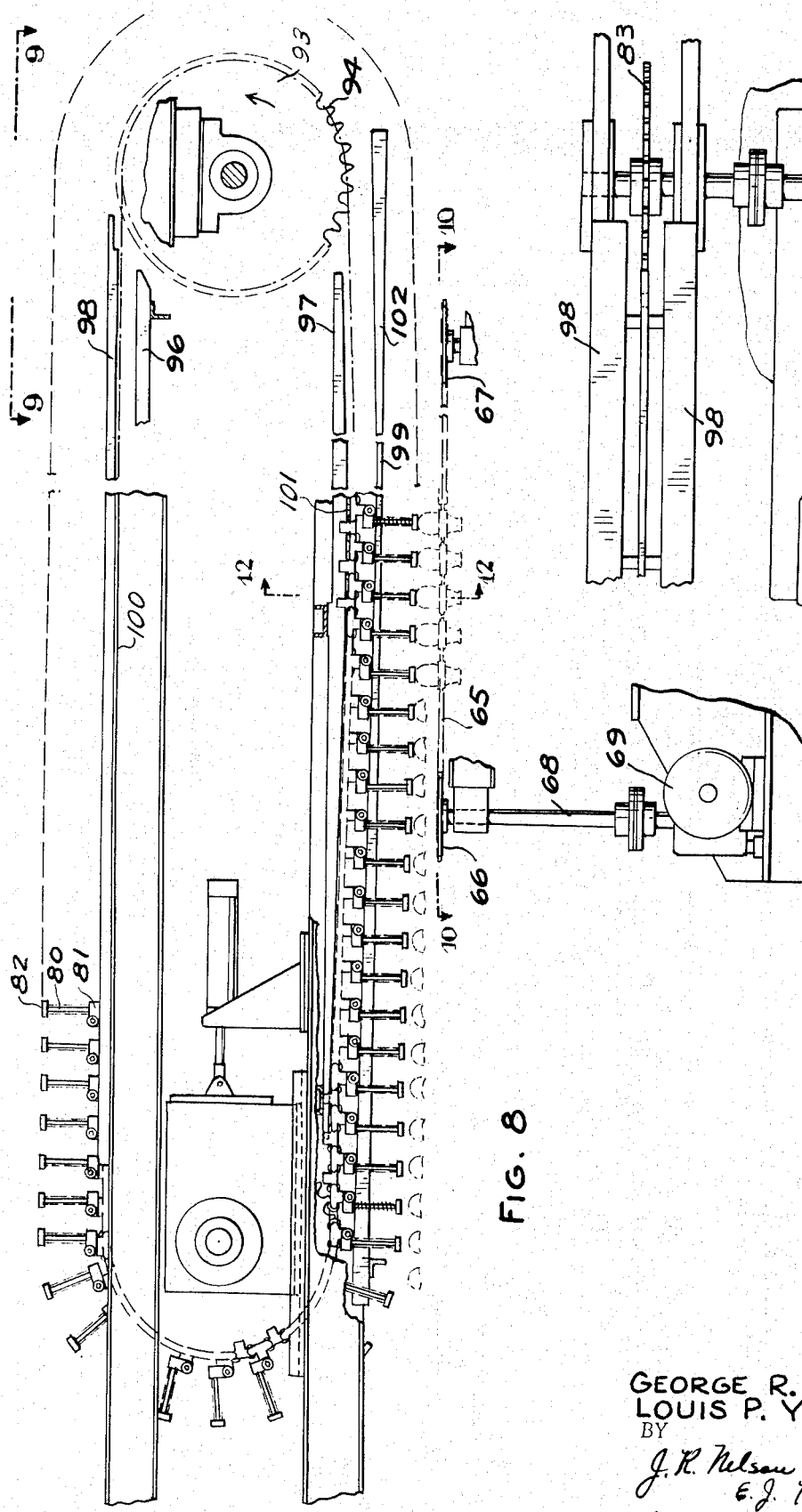
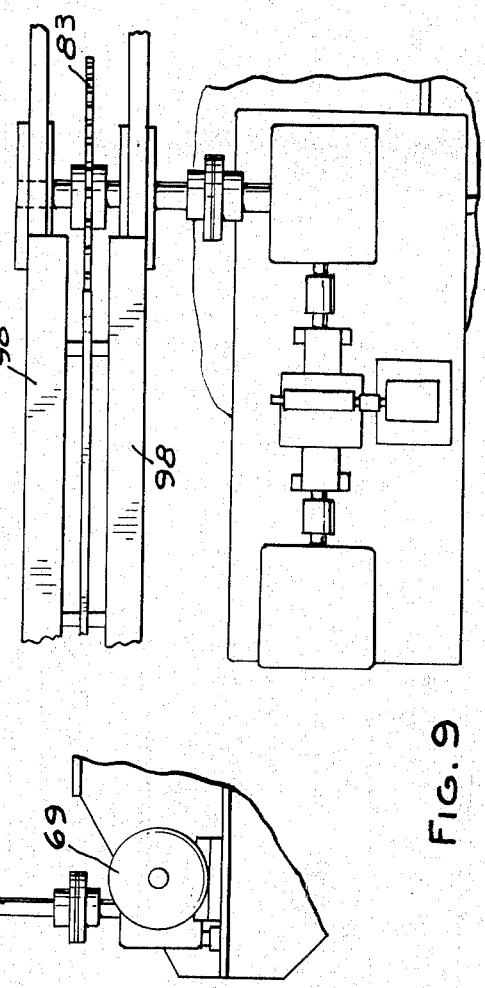
Fig. 8
Fig. 9

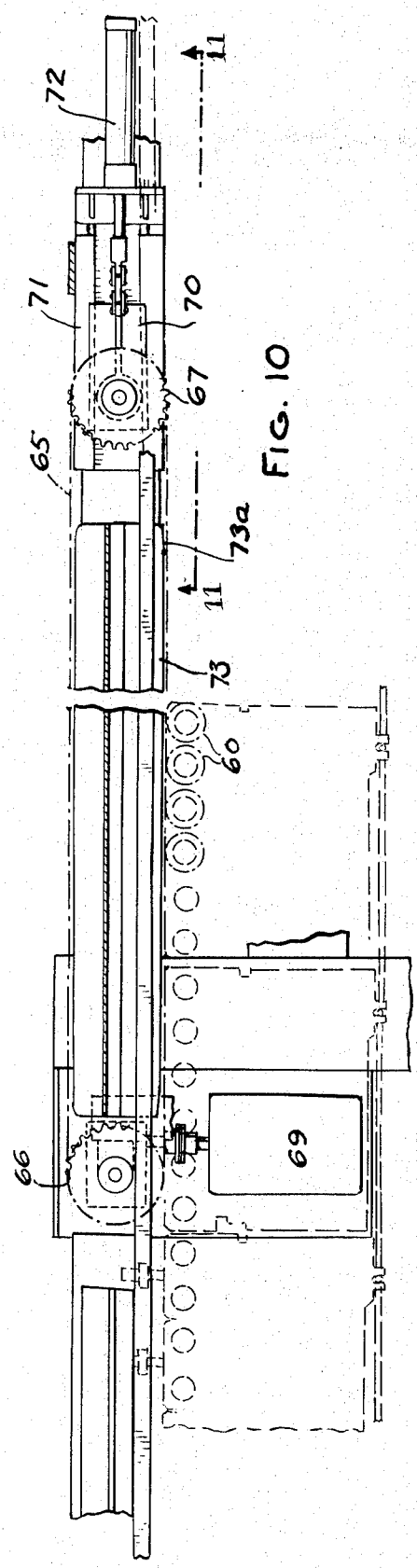

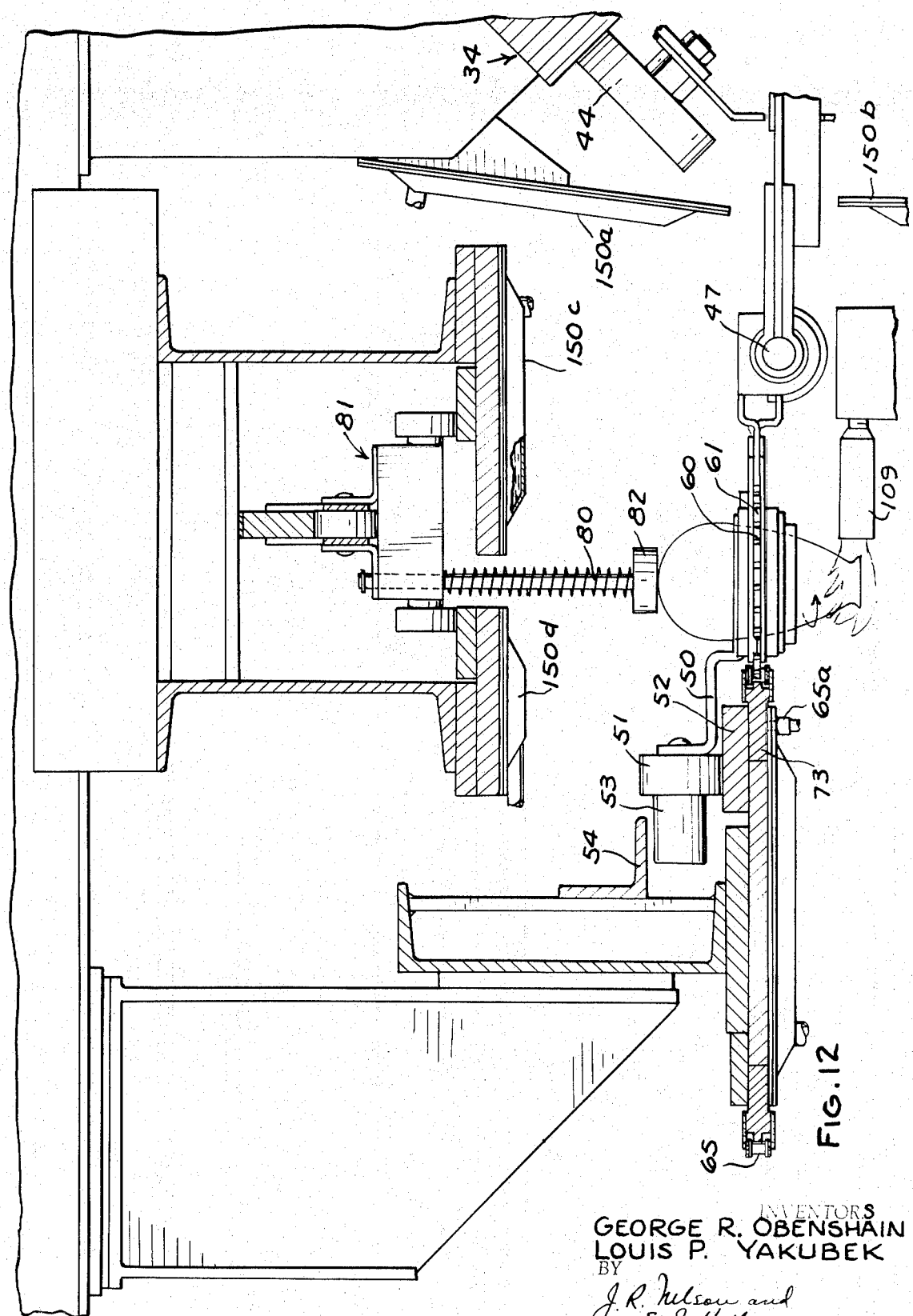

INVENTORS
GEORGE R. OBENSHAIN
LOUIS P. YAKUBEK
BY
J. R. Nelson and
E. J. Haller
ATTORNEYS INVENTORS
GEORGE R. OBENSHAIN
LOUIS P. YAKUBEK
BY
J.R. Nelson and
E.J. Holler
ATTORNEYS

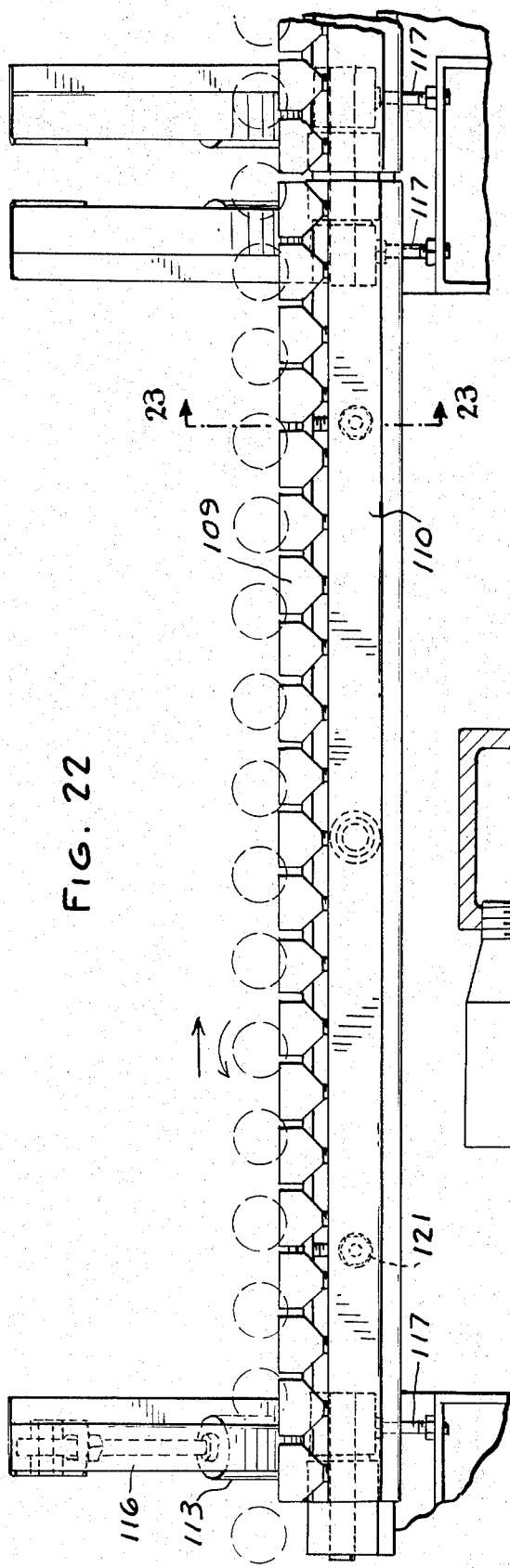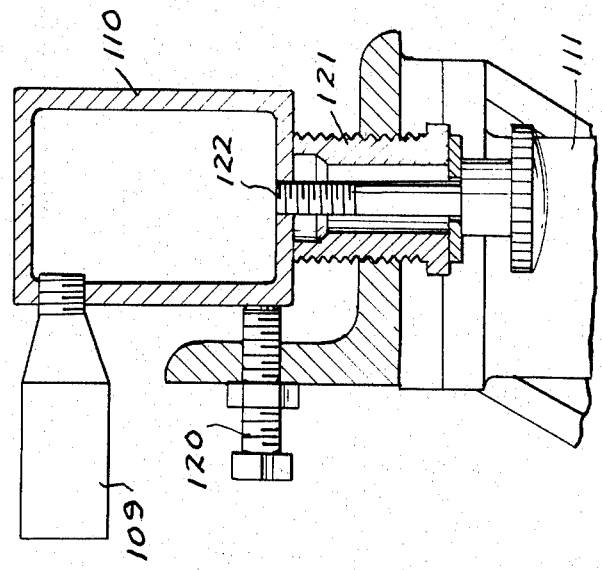

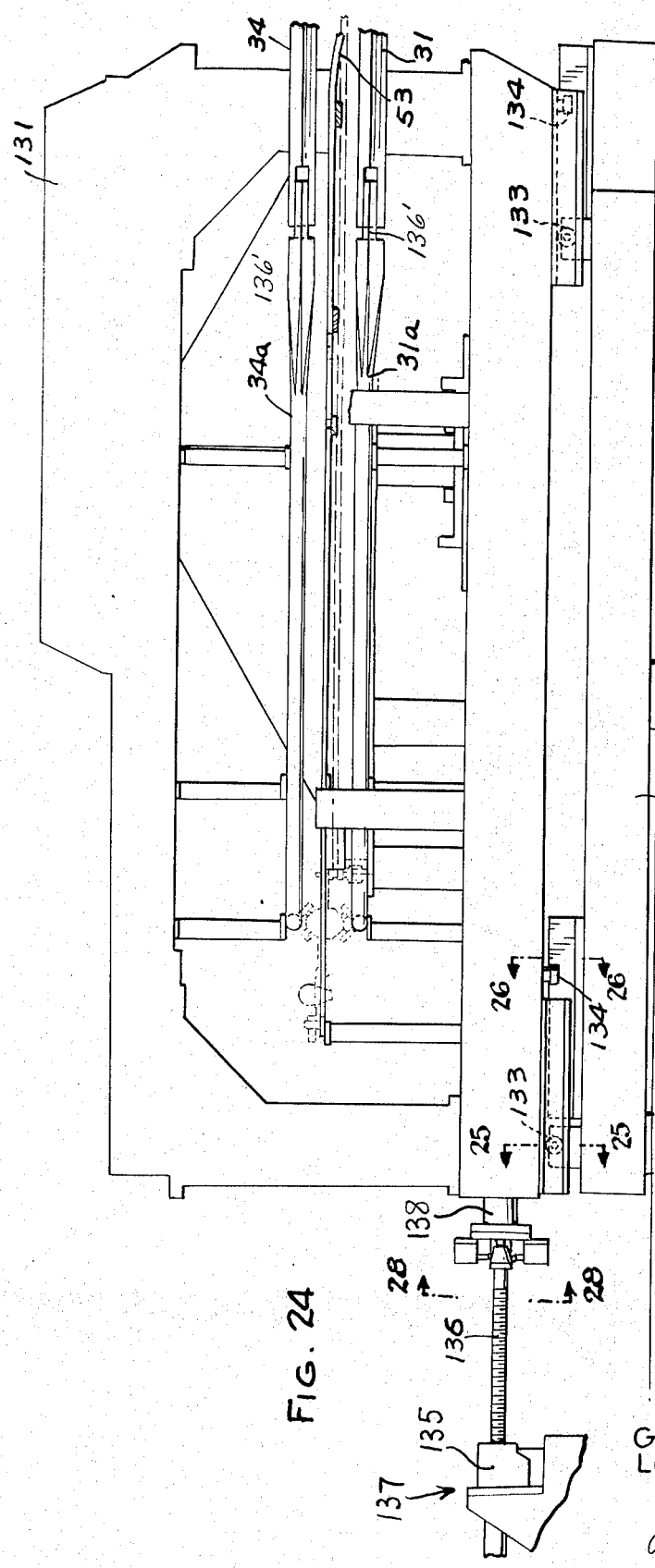

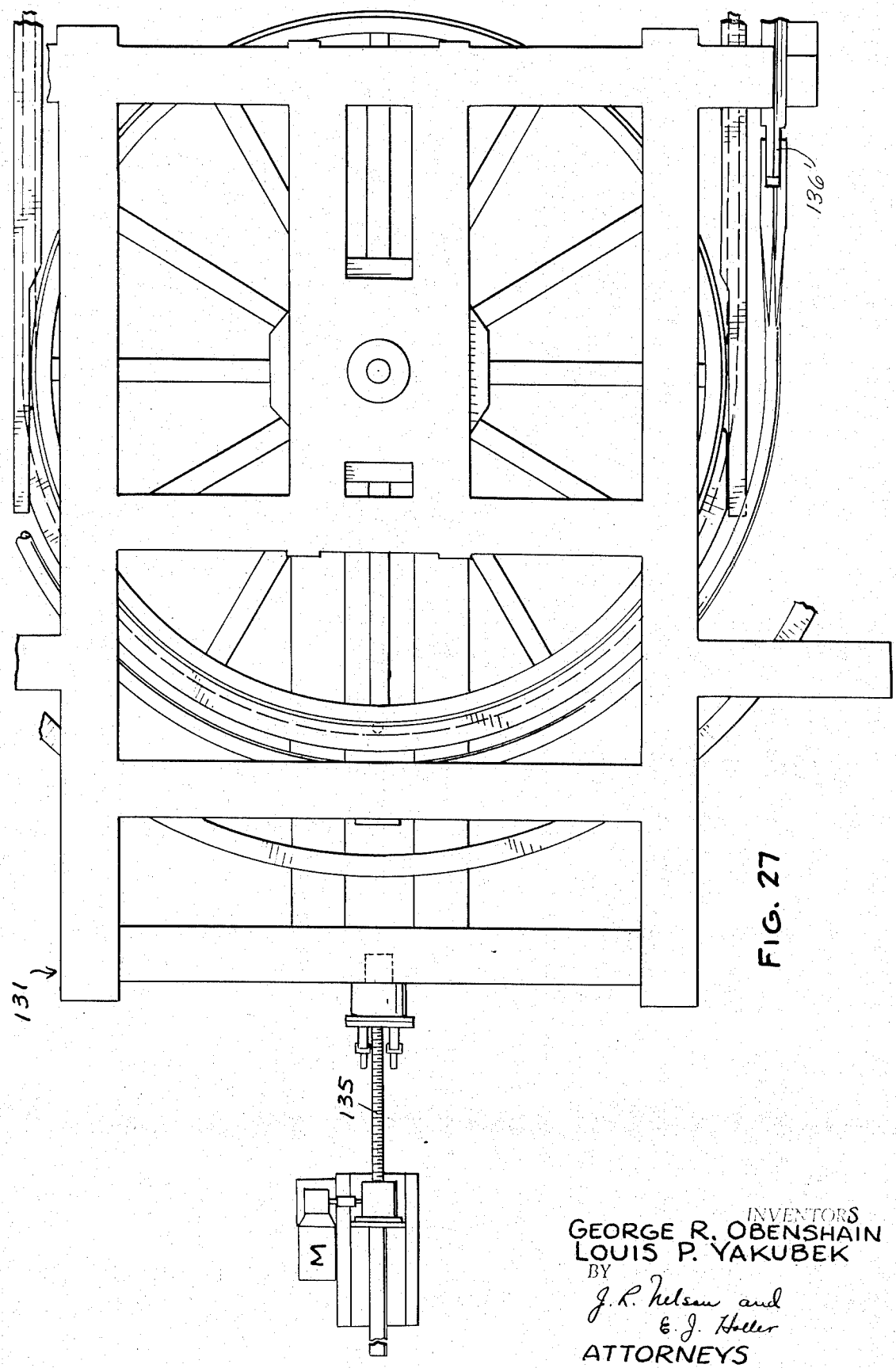

GLASS MAKING MACHINERY

This invention relates to a glass making machine and particularly to machines for heat treating hollow glass articles.

BACKGROUND OF THE INVENTION

In the making of hollow glass articles such as open-ended glass containers, it is often desirable to work upon a portion of the article, for example, to heat treat the open end of a hollow glass article. For example, in the manufacture of hollow glass articles in accordance with the method and apparatus set forth in the application of R. A. Heaton, et al., Ser. No. 24,721, filed Apr. 1, 1970, titled "Manufacturing System for Containers" now U.S. Pat. No. 3,703,363, a heat treatment of the glass articles is provided. Such a heat treatment is more specifically set forth in the application of Roy A. Fike, Ser. No. 15523, filed Mar. 2, 1970, titled "Method of Making Glass Articles" now abandoned. In order to perform such a work operation on the article, the article must be supported in predetermined relation to the work device such as the heat treat device.

Accordingly, among the objects of the invention are to provide a glass making machine which will efficiently support and move hollow glass articles past a work zone or station such as a heat treat station; which will support the glass articles in stable relation as they are moved through the heat treat station; wherein the area of the glass article to be worked upon is remote from the conveying mechanism so that the conveying mechanism is not adversely affected by the heat from a heat treat apparatus; wherein the support for the glass articles can be readily replaced with minimum interruption in the work on the articles; wherein a novel type of conveyor, carriage and support structure is utilized; wherein a novel conveyor takeup mechanism is utilized; wherein a novel support structure is provided for the glass articles; and wherein the machine can be manufactured at relatively low cost.

SUMMARY OF THE INVENTION

In accordance with the invention, the glass making machine embodying the invention comprises an endless conveyor that includes an endless driven conveyor element that moves carriages in an endless path. Each carriage has a plurality of work supporting heads pivoted thereon for swinging movement about generally horizontal axes and at least one support is rotatably mounted in each head and has an opening for receiving a glass article. Means are provided along the path of the conveyor for engaging and rotating the support and means are provided along the path of the conveyor for holding the heads in such a manner that the article is supported in generally upright position. In addition, means are provided at the heat treat station to hold the articles in proper vertical position. The apparatus further includes a novel conveyor, carriage and support structure, novel conveyor takeup mechanism, novel article support structure, and novel lubricating apparatus.

DESCRIPTION OF THE DRAWINGS

FIG. 1 is a plan view of the glass making machine embodying the invention, parts being removed.

FIG. 2 is a fragmentary partly diagrammatic plan view of the same, parts being broken away.

FIG. 3 is a partly diagrammatic view showing the work function on the hollow glass articles at several stations.

FIG. 4 is a fragmentary sectional view on an enlarged scale taken along the line 4—4 in FIG. 2.

FIG. 5 is a fragmentary plan view on an enlarged scale of a portion of the system shown in FIG. 1.

FIG. 8 is a fragmentary sectional view on an enlarged scale taken along the line 8—8 in FIG. 2.

FIG. 9 is a fragmentary view taken along the line 9—9 in FIG. 8.

FIG. 10 is a fragmentary sectional view taken along the line 10—10 in FIG. 8.

FIG. 11 is a fragmentary view taken along the line 11—11 in FIG. 10.

FIG. 12 is a fragmentary sectional view on an enlarged scale taken along the line 12—12 in FIG. 8.

FIG. 12a is a fragmentary perspective view of a portion of the apparatus shown in FIG. 12.

FIG. 12b is a fragmentary sectional view taken along the line 12b—12b in FIG. 12a.

FIG. 22 is a fragmentary plan view of the heating section including the burners.

FIG. 23 is a fragmentary sectional view on an enlarged scale taken along the line 23—23 in FIG. 22.

FIG. 24 is a fragmentary end elevational view of the apparatus embodying the invention.

FIG. 25 is a fragmentary sectional view on an enlarged scale taken along the line 25—25 in FIG. 24.

FIG. 26 is a fragmentary sectional view on an enlarged scale taken along the line 26—26 in FIG. 24.

FIG. 27 is a fragmentary plan view of a portion of the apparatus shown in FIG. 24.

GENERAL DESCRIPTION

Figure 6:
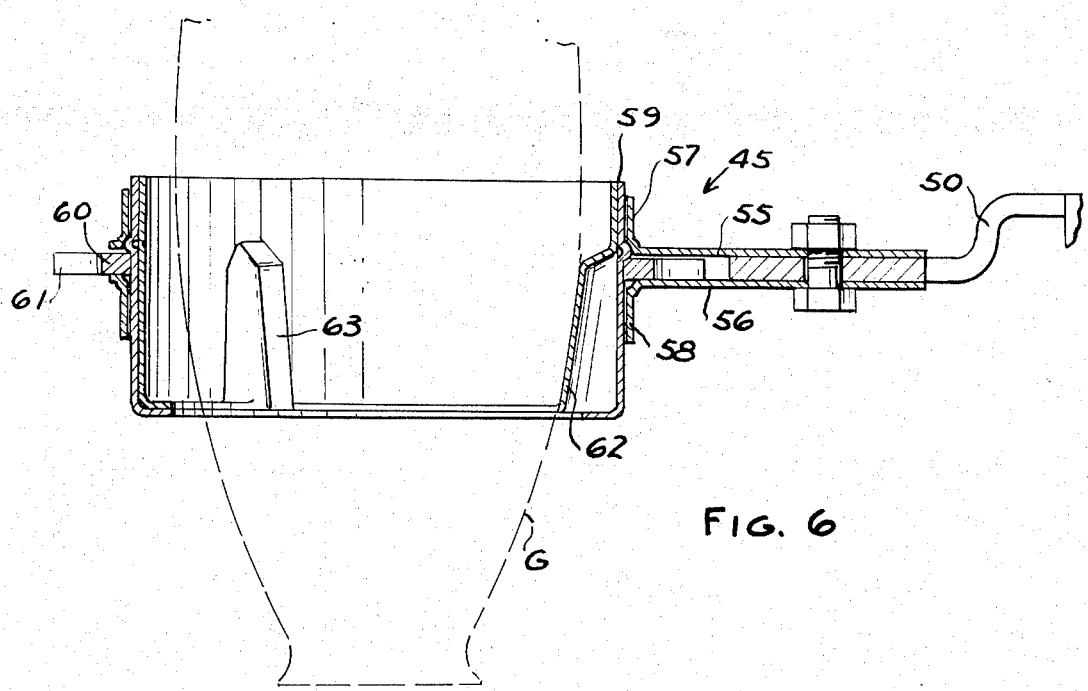
FIG. 6 is a fragmentary sectional view taken along the line 6—6 in FIG. 7.

The apparatus shown and described herein is intended for use in connection with the manufacture of glass articles from a ribbon of glass such as disclosed in the aforementioned application Ser. No. 24,721 and particularly to the heat treatment of the glass articles such as disclosed in the aforementioned application Ser. No. 15,523.

Referring to FIGS. 1 and 2, which are plan views of the glass making machine, the machine is specifically shown as a glass heat treating machine wherein the ends of hollow glass articles G (FIG. 3) are subjected to heating, quenching and cooling to heat treat portions of the surfaces thereof. The machine is adapted to support the glass articles G in generally upright position as shown in FIG. 3 with the open end or neck end facing downwardly and to move the glass articles through the various heating, quenching and cooling operations. Referring to FIGS. 1 and 2, the glass articles are delivered at an entry zone A and moved through a heating zone B, quenching zone C and cooling zone D. Finally, the articles are removed at a delivery or removal zone E. Any broken or otherwise defective articles that are left in the supports are rejected at a reject zone F, leaving the conveyor in a position to receive new articles at zone A.

Throughout the movement in the heating zone B, quenching zone C and cooling zone D, the articles are rotated about their axes. Particularly in the heating zone, the articles are maintained in accurate spaced relationship to burners, as presently described.

CARRIAGE AND CONVEYOR STRUCTURE

The glass articles are received in carriages that form a part of the conveyor that is moved in an endless path through the various zones or stations.

Referring to FIG. 1, the apparatus comprises a base 20 on which an endless chain conveyor 21 is moved in an endless path, the chain 21 is trained over wheels 22, 23 and is driven by a drive sprocket 24 through a motor 25 (FIG. 2). In order to distribute the load and prevent undue tension on portions of the chain, additional drive sprockets 24a, 24b and motors 25a, 25b are provided at longitudinally spaced points along the track. The sprockets 24a, 24b serve to maintain portions of the conveyor at predetermined pitch or spacing in the areas where containers are delivered to the conveyor in order that there be proper registry with the conveyor delivering the articles. Similarly, sprockets 24c, 24d maintain portions of the conveyor in predetermined spacing in areas where the articles are removed from the conveyor. The specific structure of such a mechanism is disclosed in the copending application Ser. No. 6,895, filed Jan. 29, 1970 titled "Chain Driven Machinery" now abandoned.

Chain 21 is provided with rollers 26 and is guided in its movement by passage of the rollers between guide rails 27, 28 (FIG. 4). Chain 21 is provided with a plurality of wheels 29 that are swiveled about vertical axes to the chain by brackets 30. Wheels 29 engage a track 29a.

The base 20 is further provided with an endless track which is in the form of a rail 31 having a square cross section rail defining surfaces 32, 33 that are inclined to the vertical. The endless track includes a similar rail 34 in overlying and spaced relation to the rail 31.

As shown in FIGS. 4 and 5, a plurality of carriages 35 are provided along the track rails 31, 34. Each carriage 35 comprises a generally flat sheet metal body 36 and is connected to an upright pin 37 on the chain 21 by a bracket 38 that has a slot 39 engaging the pin 37.

Each carriage 35 further includes complementary upper and lower sheet metal parts 40, 41 that are mounted on the body 36 by spaced supports 42, 43. Wheels 44 are rotatably mounted on the inclined surfaces of the supports 40, 41 for rotation about transverse inclined axes so that the peripheries of the wheels 44 engage the opposite surfaces 32, 33 of the tracks 31, 34. In this manner, the carriages 35 are freely movable along the track rails 31, 34 by the conveyor chain 21. Each support 40, 41 is rotatably mounted on its support 42, 43 and yieldingly urged by springs 40a against a strip 40b to accommodate turns of rails 27, 28. (FIG. 5)

As shown in FIG. 5, each of the carriages 35 supports a plurality of heads 45 for swinging movement about a horizontal axis. Each head 45 includes longitudinally spaced laterally extending arms 46 each of which is formed with a pin 47 which extends through aligned openings 48 (FIG. 4) of brackets 49 on the carriage 35. By such an arrangement, the head 45 is readily mounted and removed from the carriage 35. Each head 45 further includes a guide arm 50 which rotatably supports a roller 51 that engages a guide bar 52 along the path of the heads 45. The guide arm 50 further supports a second roller 53 which is adapted to be engaged by a second guide bar 54 for maintaining the roller 51 against the guide bar 52 and preventing inadvertent movement of the heads 45 upwardly during certain portions of their movement in the endless path.

Figure 7:
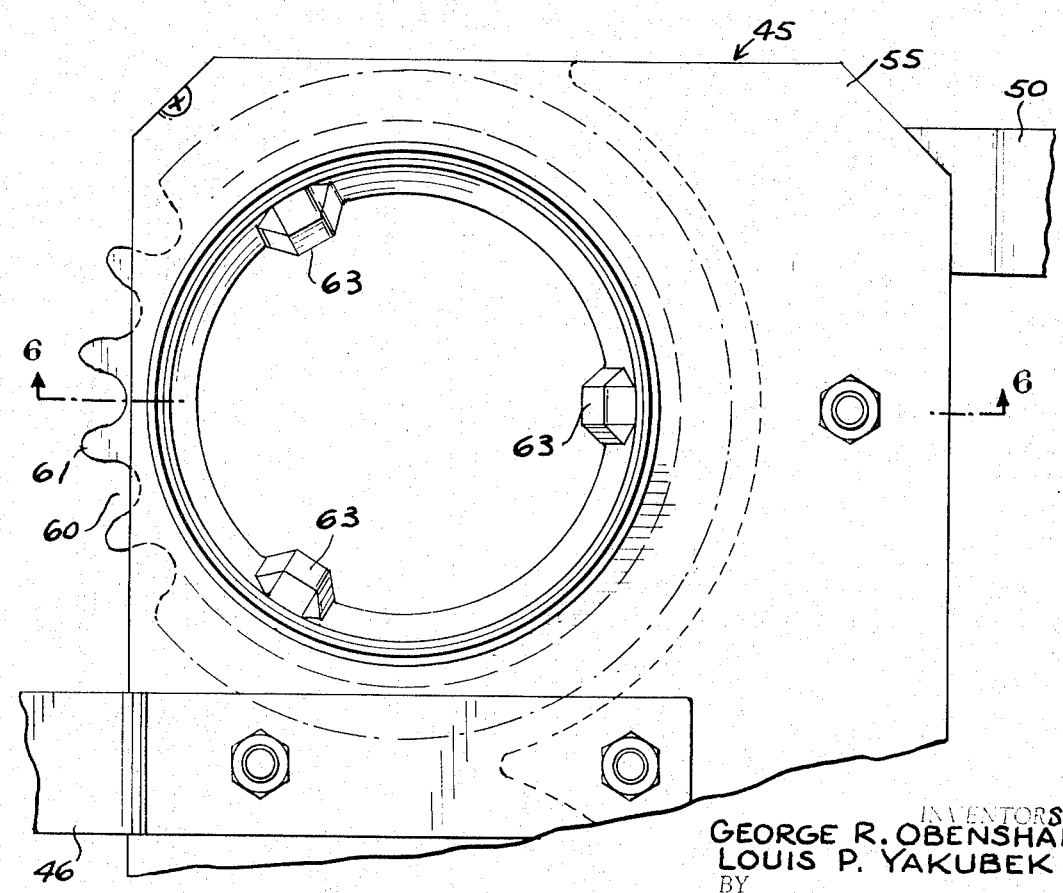
FIG. 7 is a fragmentary sectional view on an enlarged scale of a portion of the apparatus shown in FIG. 5.

Referring to FIGS. 6 and 7, each head 45 comprises spaced sheet metal plates 55, 56 which have upwardly struck flanges 57 and 58. A support 59 has an annular sprocket member 60 fixed thereto. Sprocket 60 extends between the plates 55, 56 to rotatably mount support 59 on head 45. Sprocket 60 has outwardly extending teeth 61 which are adapted to engage means along portions of the path to rotate the supports as presently described. Each support 59 is formed with an internal tubular sleeve 62 that has inwardly projecting portions 63 that extend axially of the opening of the sleeve 62 and are inclined downwardly and inwardly to receive and engage the glass article G at circumferentially spaced points.

ARTICLE ROTATING MECHANISM

As previously set forth above, the articles while passing through the heating, quenching and cooling zones are rotated about their vertical axes. This is achieved in the heating and quenching zones by engagement of the sprockets 60 on each support 59 with a moving chain. In the cooling zone D, this is achieved by engagement of the teeth on the sprocket 60 with a fixed chain mounted along the path of the supports.

Referring to FIGS. 8–12, a chain 65 is trained over horizontal sprockets 66, 67 which are positioned along the path of the containers in the area of the heating and quenching zones B, C. Sprocket 66 is driven by a shaft 68 and motor drive 69. Sprocket 67 is mounted on a bracket or slide 70 movable in a slideway 71 under the action of a cylinder 72 to take up any slack in the chain 65.

As shown in FIG. 12, guides 73 are provided to guide the chain and hold it in position for engagement by the teeth of sprockets 60 thereby rotating the sprockets 60 and, in turn, the containers. As shown in FIG. 10, a portion 73a of the guides is inclined gradually to bring the chain into engagement with the sprockets 60 as the sprockets are mvoed into position.

Figure 13:
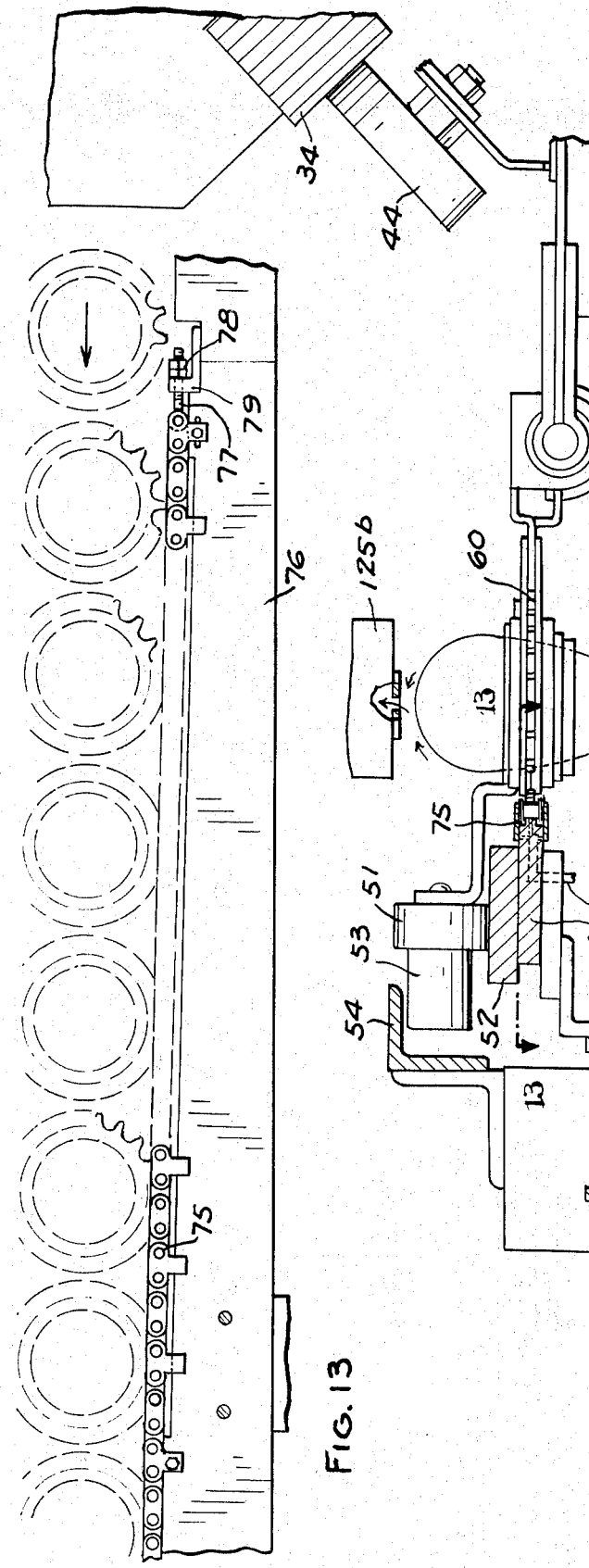
FIG. 13 is a fragmentary sectional view taken along the line 13—13 in FIG. 14.
Figure 14:
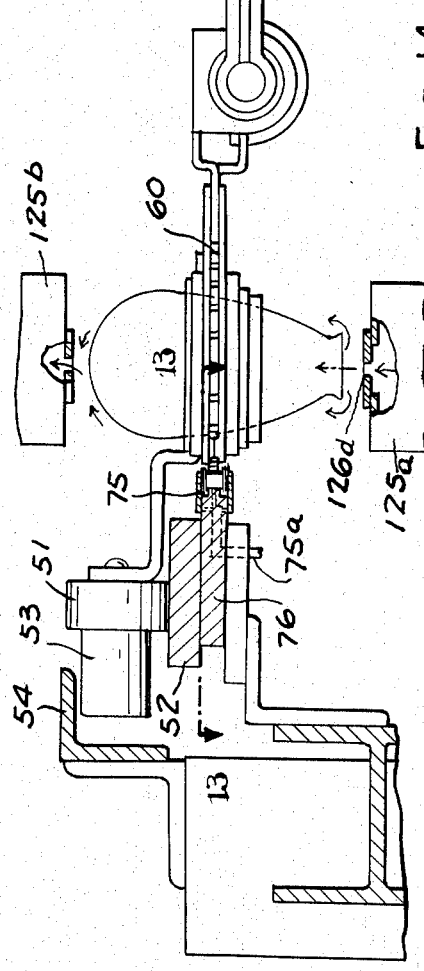
FIG. 14 is a fragmentary sectional view taken along the line 14—14 in FIG. 2.
Figure 15:
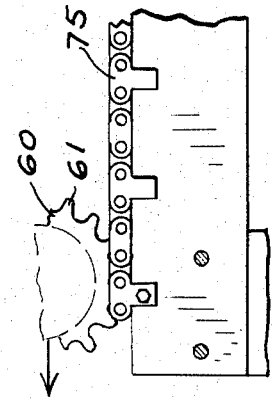
FIG. 15 is a fragmentary view similar to FIG. 13 of another portion of the apparatus which is not shown in FIG. 13.
Figure 16:
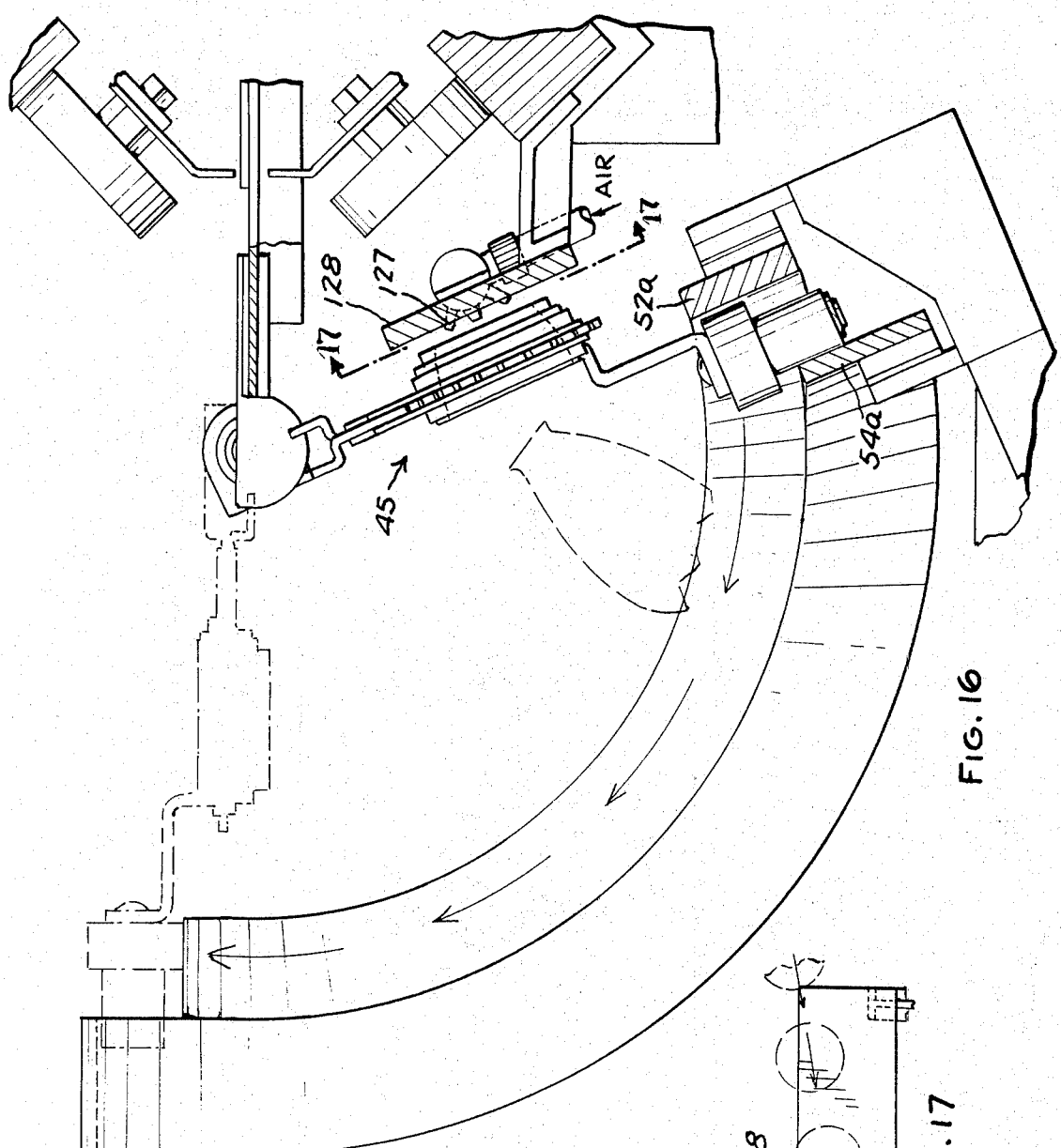
FIG. 16 is a fragmentary sectional view on an enlarged scale taken along the line 16—16 in FIG. 2.

As shown in FIGS. 13–15, a length of chain 75 is fixed on a support 76 along the path of the containers in the area of the cooling zone D. The teeth 61 of sprocket 60 engage the fixed chain 75 to cause rotation of the sprockets 60 and, in turn, the articles at a slower speed while they travel through the cooling zone D.

Fittings 65a, 75a are provided to permit lubricant to be fed to chains 65, 75 respectively. As the lubricant is transferred to the sprockets 60 and sprockets 60 rotate within the support 59, the lubricant is transferred in the area between the support 59 and the sprocket 60 to lubricate that portion and thereby prevent binding that might occur if the portions are not lubricated. (FIG. 6)

In addition a threaded shaft 77 attached to one end of chain 75 is threaded into nuts 78 which engage a bracket 79 to apply tension to chain 75.

ARTICLE HOLD DOWN MECHANISM

Figures 12A, 12B:
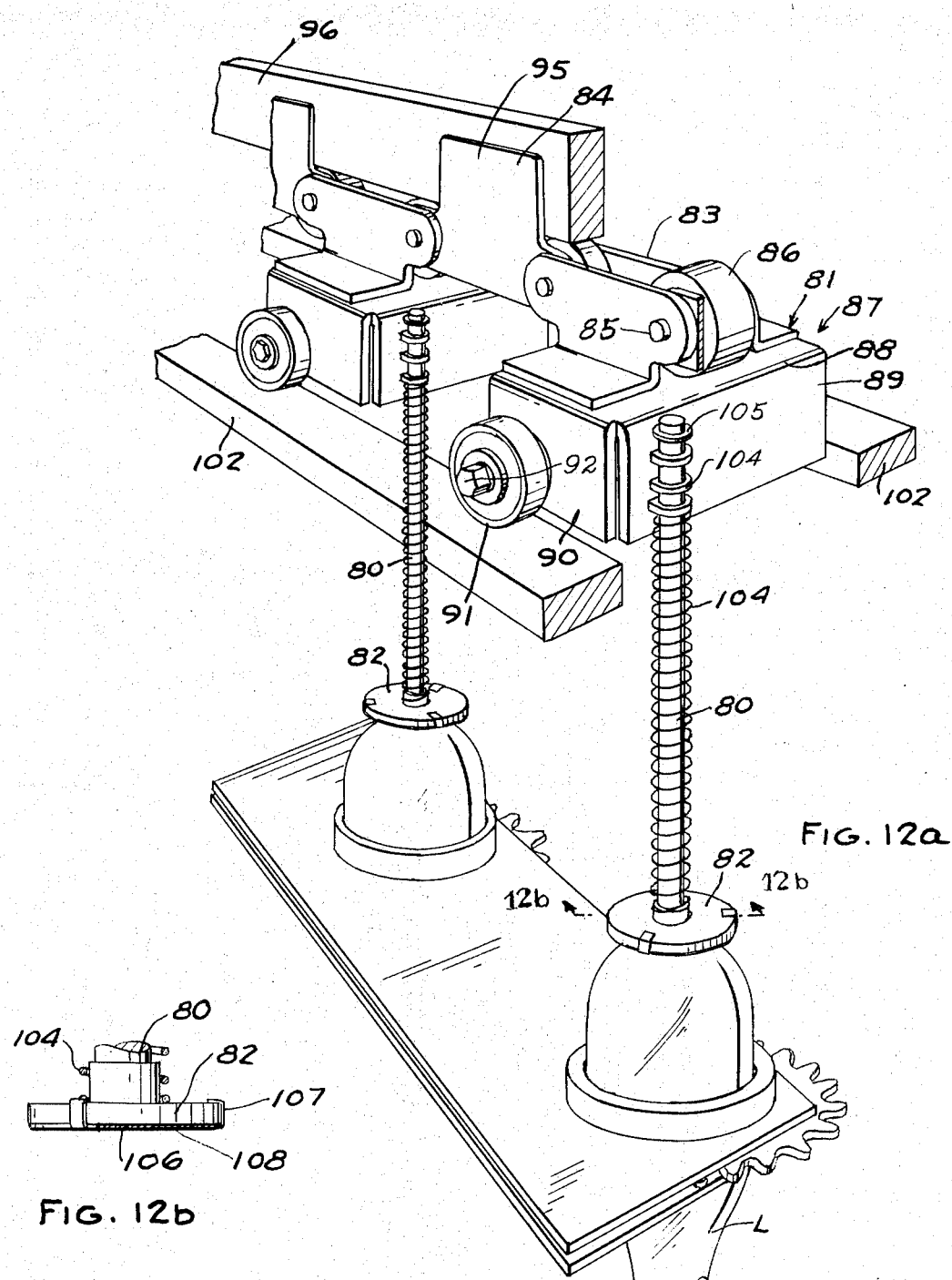

In order to insure that the articles will remain in proper position during the application of heat thereto in the heating zone B, a mechanism is provided for applying a force to the upper ends of the articles as they pass through the heating zone. As shown in FIGS. 8, 12, 12a and 12b this mechanism comprises a plurality of hold down members 80 in the form of rods which are supported as presently described by a carrier 81 in overlying relationship to a portion of the path of the articles (FIG. 12). Each hold down member 80 includes a lower pad 82 that is adapted to engage the closed end of the article G to hold the workpiece in vertically and laterally aligned relationship in the work holder. Each hold down member 80 is yieldingly urged downwardly to provide a constant force on the upper end of the workpiece G.

Referring to FIGS. 8 and 12a, the carrier 81 comprises alternating pairs of links 83, 84 that are pivoted to one another by shafts 85. Rollers 86 are rotatably mounted on the shafts 85. The links are preferably made of sheet metal. Link 83 supports hold down member support bodies 87 which are made of sheet metal and comprise a base 88, front wall 89, and side walls 90. Rollers 91 are rotatably mounted about horizontal shafts 92 extending to the side walls 90. The carrier includes sprockets 93 having teeth 94 at opposite ends over which the links 83, 84 are trained, the sprockets having pockets 94 which engage the rollers 86.

The links 83 include radially outwardly extending ears 95 that are adapted to engage a guide bar 96 on the upper reach and a guide bar 97 on the lower reach (FIG. 8). The rollers 91 engage a track defined by bars 98 along the upper reach and 99 along the lower reach. The bars 98 of the upper reach are supported on the upper flanges of channels 100 while the bars 99 of the lower reach are supported on the lower webs of spaced flanges 101. Guide members 102 are provided on the bar 99 at each end thereof to gradually guide the carrier 81 downwardly toward the articles and gradually upwardly away from the articles.

Each hold down member 80 comprises a rod that is guided for movement relative to the body 87 by spaced flanges 103. A compression spring 104 is interposed between the pad 82 and outwardly struck flange 103 and the pad 81 yieldingly urges the hold down rod 80 away from the body 87. A washer 105 fixed on the end of the rod 80 limits the movement of the rod away from the body 87.

As shown in FIG. 12b, a removable pad 106 is provided on each pad 82 and includes spring fingers 107 that hold the pad 106 on the pad 82. A layer 108 of low friction material is provided on the outer surface of the pad 106 to minimize the friction between the pad and the glass articles. The low friction material may comprise a rubberized asbestos fabric or a pad of graphite.

In operation, as the conveyor having the glass articles thereon is moved to the heating zone B, the carrier 80 operates in synchronized relationship to bring successive hold dowm members 90 gradually downwardly in position for yieldingly engaging the closed upper ends of the article G. This engagement continues through the work area and then the carrier 80 is gradually guided by the members 102 away from the workpieces or articles in the closed path and thereafter brought successively into engagement again with successive workpieces. Means are provided for synchronizing the drive of the hold down carrier to the conveyor and comprises a sensor that senses the rate of rotation of the sprocket. Such a mechanism is more clearly disclosed in application Ser. No. 24,721, filed Apr. 1, 1970, titled "Manufacturing System for Containers."

HEATING SECTION

The heating section or zone B comprises a plurality of burners. The length of the section is sufficient to heat the end of the articles to the desired temperature so that upon quenching, proper heat treatment is achieved. In order to facilitate access and maintenance, the burners 109 are provided in banks or groups.

Figure 21:
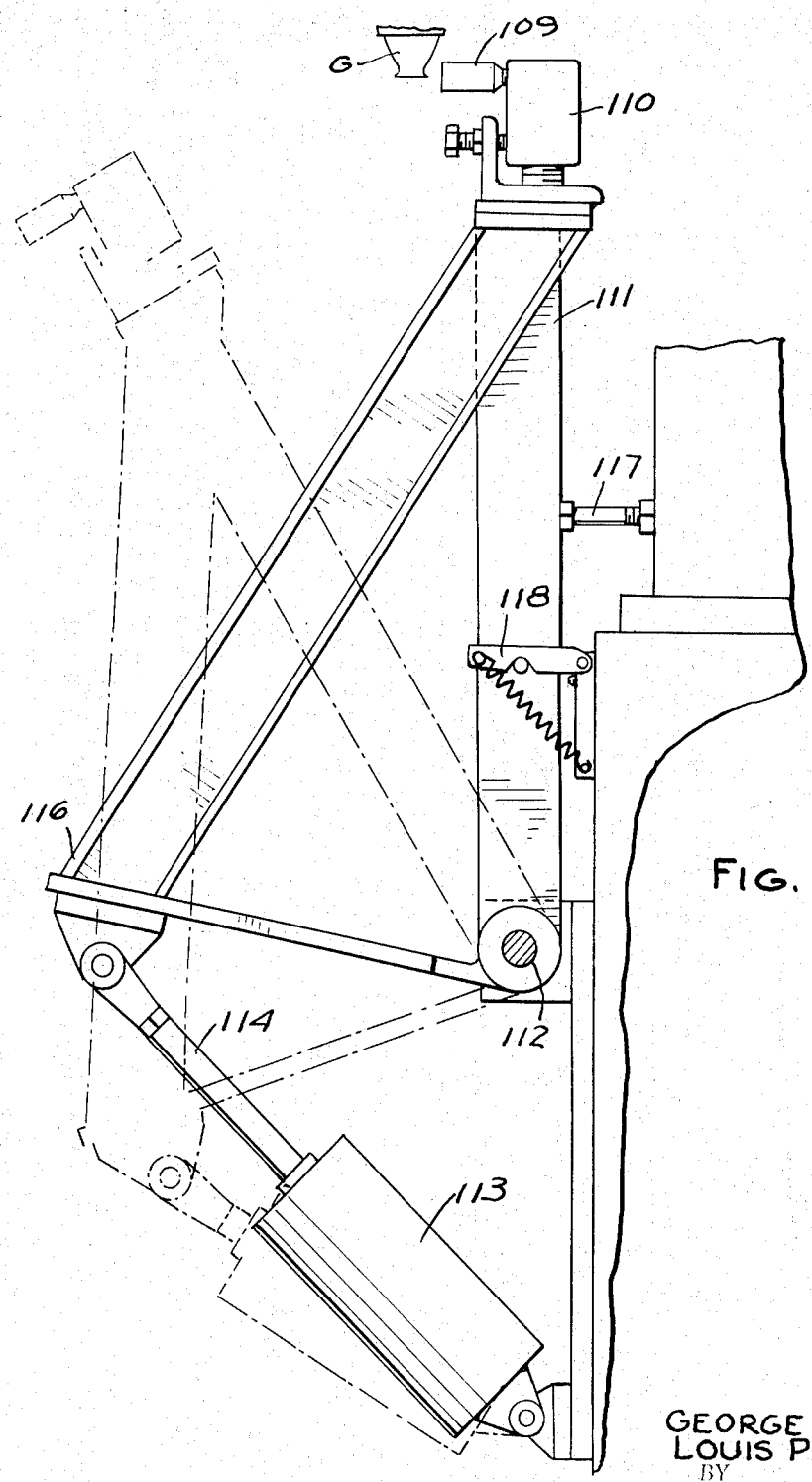
FIG. 21 is a fragmentary elevational view showing the burner positioning mechanism.

Referring to FIGS. 21–23, each bank of burners is mounted on a manifold 110 that is, in turn, mounted on arms 111 that are pivoted on shaft 112. A pair of fluid operated cylinders 113 are provided for swinging each bank into and out of position. As shown in FIG. 21, each cylinder 113 has its shaft 114 pivoted to a bracket 116 connected to the arms 111. By actuating the cylinders, the burners 109 can be swung between the solid line and broken line position (FIG. 21), the solid line position being the working position. An adjustable stop 117 engages arms 111 to control the position of the burners in operating position. A spring loaded latch 118 holds the burners in the operating position in the event of loss of pressure in cylinders 113.

As shown in FIG. 23, the manifold 110 is adjustably mounted with respect to the upper end of the arms 111 by screws 120, 121 that are adjustably received in the upper end of the arms 111 and engage the manifold 110. A lock screw 122 extends through screw 121 into manifold 109 to hold the manifold on the screw 121.

COOLING SECTION

As previously described with reference to FIGS. 1 and 2, the articles after passing through the heating section are passed through a quenching section at zone C (FIG. 3) wherein relatively cooler air is applied to the previously heated section and then through a cooling section at zone D wherein air at substantially the same temperature is directed against the articles.

At the quenching zone C, a plenum chamber 125 is provided and includes longitudinally extending slots 126a, 126b extending generally horizontally on one side and upwardly and inwardly inclined slots 126c on the opposite side which direct cooling air against the outside and inside of the open end of the containers. (FIG. 3)

At the cooling section D, plenums 125a, 125b direct air, at the same temperature as air in plenum chamber 125 downwardly and upwardly on the containers through slots 126d, 126e. (FIGS. 3, 14)

As previously pointed out, during movement through the quenching section, the articles are rotated by engagement of sprockets 60 with moving chain 65 and driving movement through the cooling section D, the articles are rotated by engagement of sprocket 60 with the stationary chain 75.

CLEARING SECTION

As previously pointed out in connection with FIG. 1, prior to placing new articles in the supports after removal at zone E, it is necessary to eject any fragmentary pieces of glass from broken articles or articles which were not removed at zone E. This is achieved through the pivotal mounting of the heads 45.

As shown in FIG. 1, in the zone F, the track or bar 52 and guide bar 54 have portions 52a, 54a that curve downwardly swinging the heads 45 to a vertical position and beyond to a position wherein the upper end of the opening of the support extends slightly downwardly. In this position, air jets from nozzles 127 are directed against the support to eject any articles or pieces of glass that have not been previously rejected. The portions 52a, 54a then curve upwardly to the horizontal position bringing each head into position for receiving additional articles.

Figure 17:
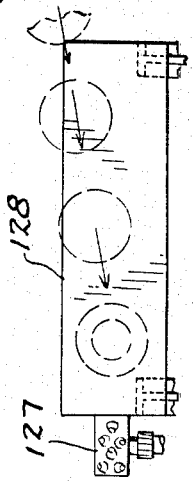
FIG. 17 is a fragmentary sectional view taken along the line 17—17 in FIG. 16.

The general path of each head toward the position wherein fragmentary glass and the like can be ejected is shown diagrammatially in FIG. 17. As shown, a push-out bar 128 is mounted in fixed position adjacent the path of the heads 45 in advance of the jets 137 to begin the ejection of any article that may have remained in the supports and the ejection process of the article and any glass pieces is then completed by the air jets from nozzles 127.

Figure 18:
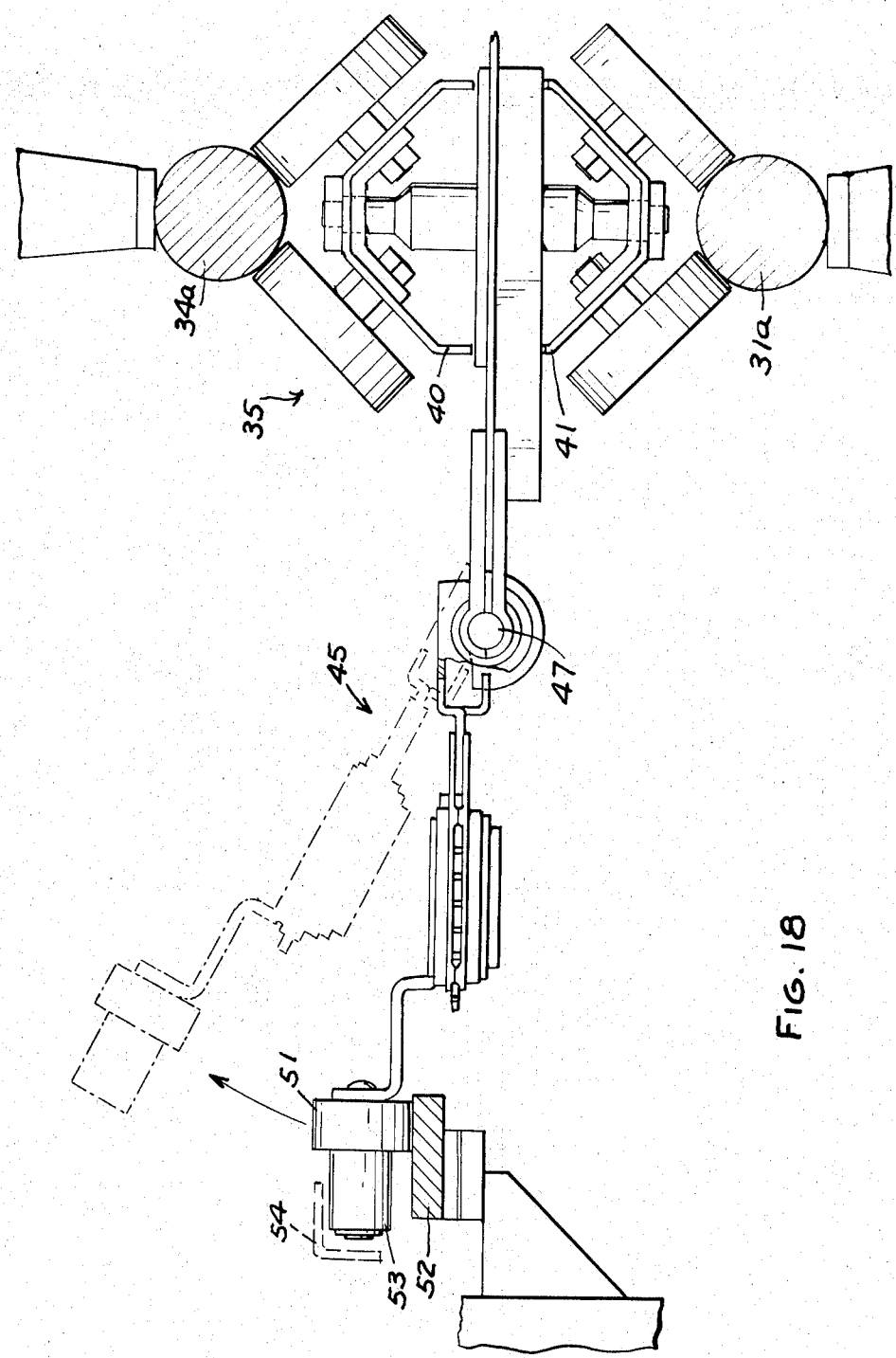
FIG. 18 is a fragmentary sectional view similar to FIG. 4 showing the manner in which parts may be removed from the apparatus.

As shown in FIG. 18, each head 45 is adapted to be readily engaged and disengaged from its support pins by swinging upwardly and then moving longitudinally to disengage the carriage from the pin 47. In order to facilitate this, a portion of the hold down track 54 may be removably mounted at an appropriate position along the path of the heads 45.

CONVEYOR SUPPORT STRUCTURE

As shown in FIGS. 19, 20 and 24–27, in the area of the wheels 22, 23, provision is made for taking up any slack in the chain 21 and this is achieved by substantially the same structure at each end. For example, wheel 22 is mounted on a post 130 that is rotatably mounted in a carriage 131. The carriage is, in turn, supported for limited movement with respect to a base 132 by horizontal rollers 133 and vertical rollers 134 which cooperate with appropriate surfaces on the base and carriage. The carriage is moved longitudinally by a screw 135.

Figure 19:
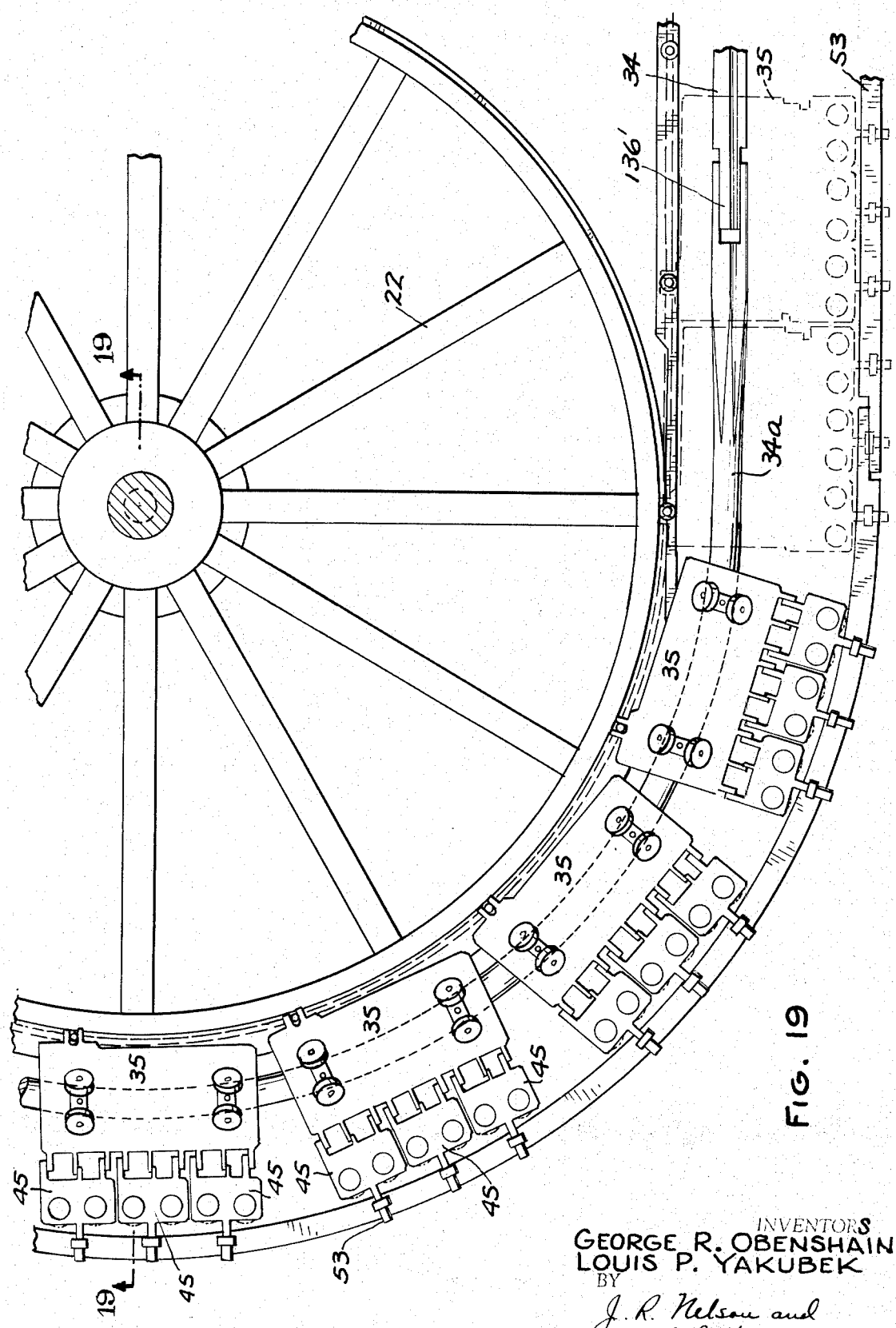
FIG. 19 is a fragmentary plan view on an enlarged scale of another portion of the apparatus shown in FIG. 2.
Figure 20:
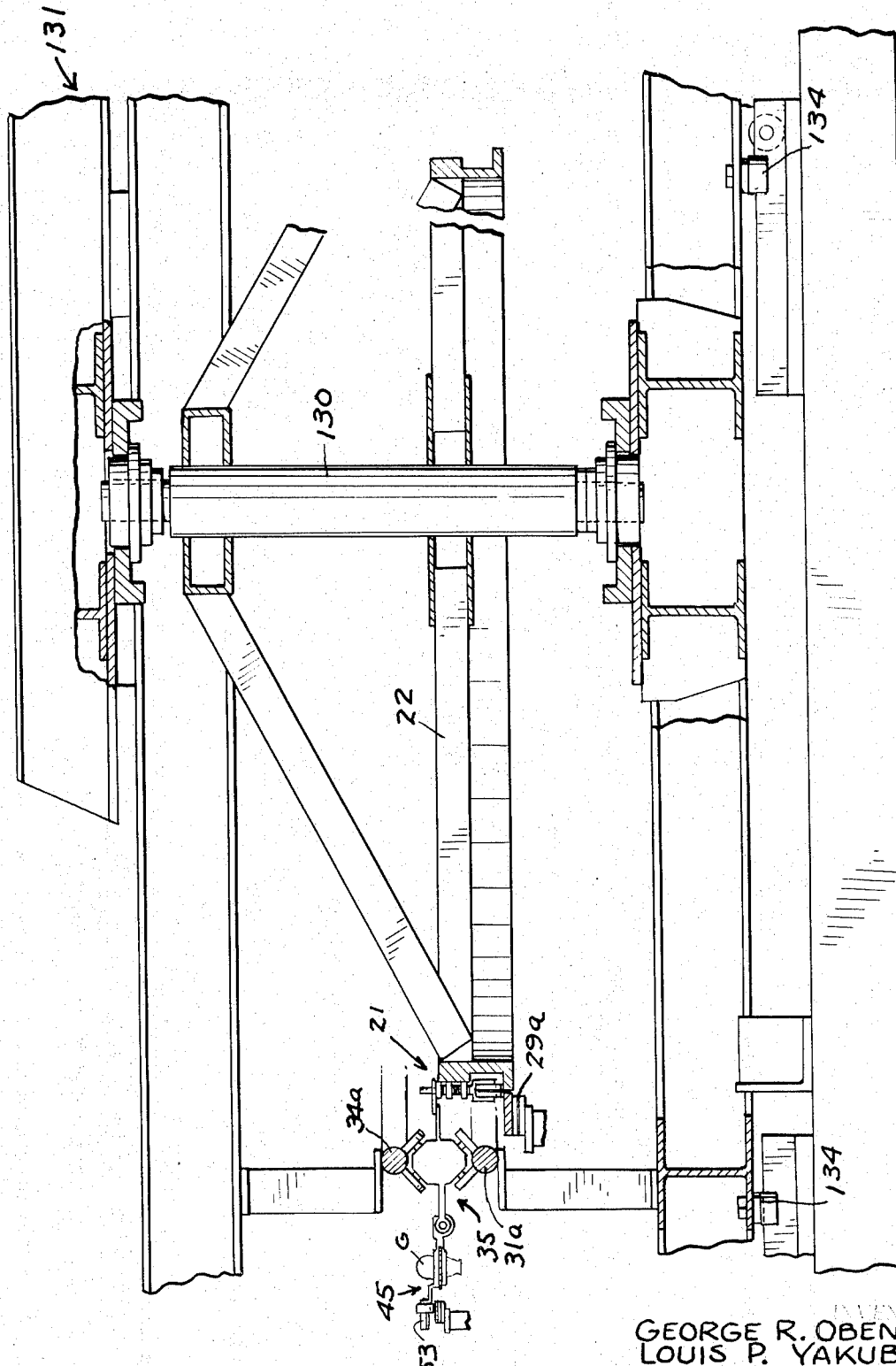
FIG. 20 is a fragmentary sectional view on an enlarged scale taken along the line 20—20 in FIG. 2.

As further shown in FIGS. 19–20, in the area of the turn, the horizontal chain support bar 29a follows the arc of the wheel 22. The carriage tracks 31, 34 merge into cylindrical rods 31a, 34a that are connected at their ends by slip joints 136' to the track section 31. Similarly, the guide 53 curves in an arc about the wheel.

Figure 28:
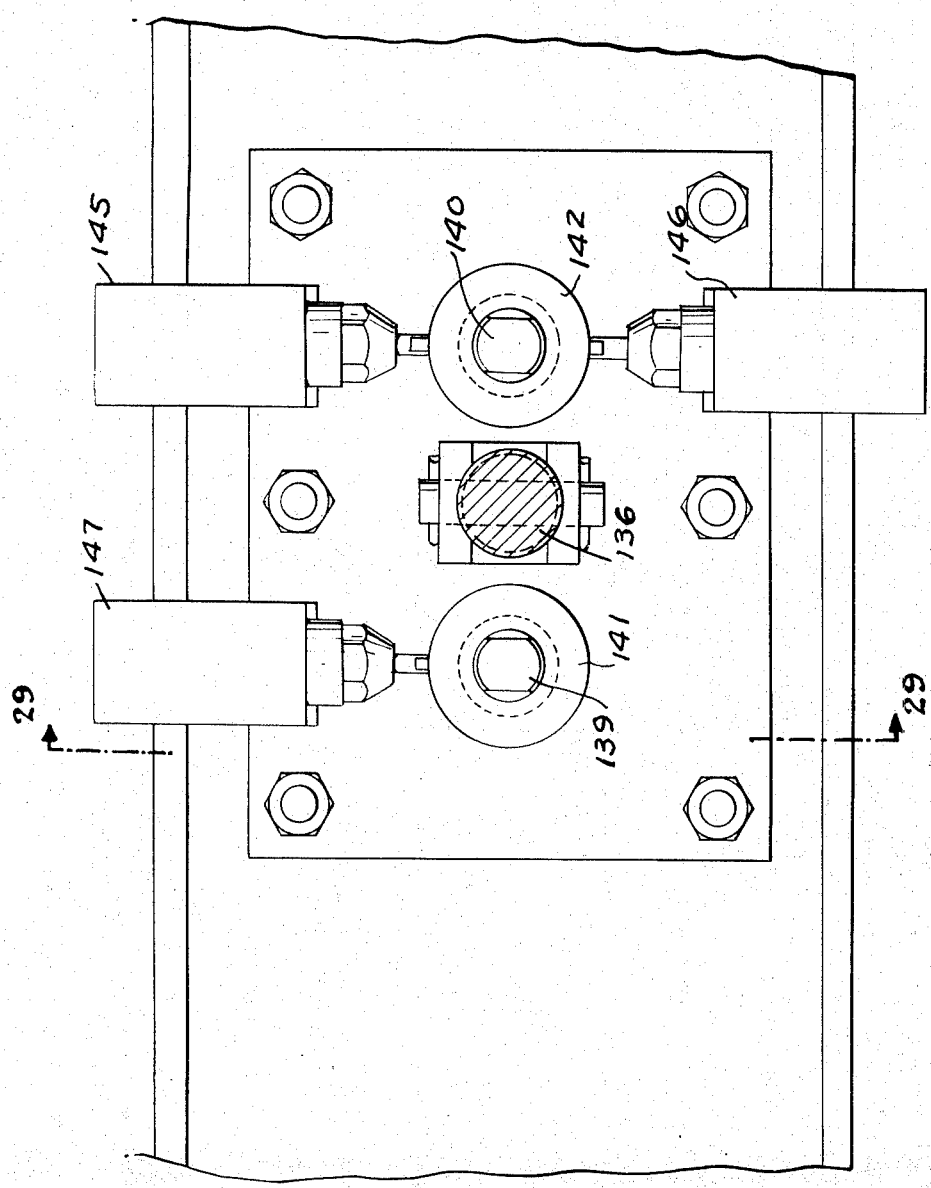
FIG. 28 is a fragmentary sectional view taken along the line 28—28 in FIG. 24.
Figure 29:
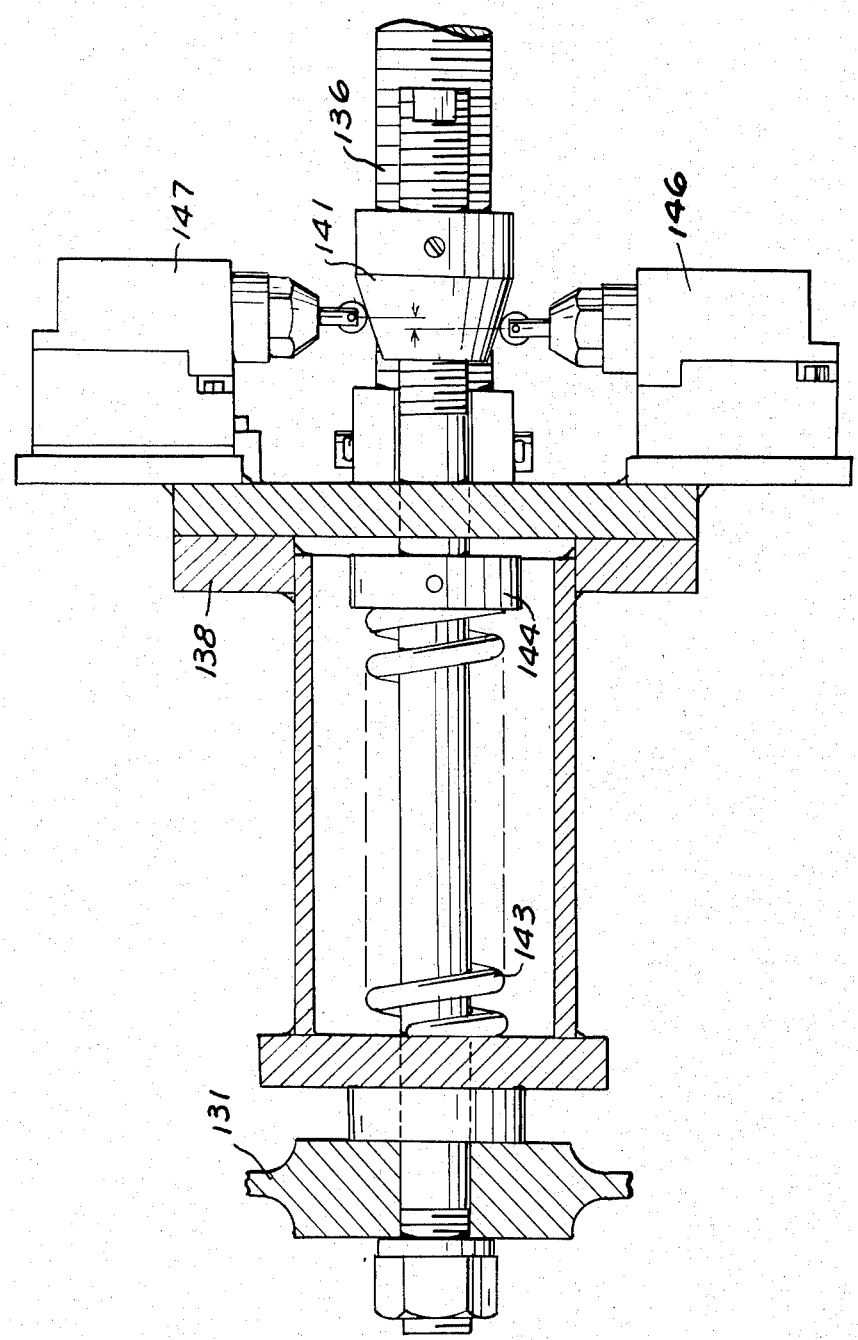
FIG. 29 is a fragmentary sectional view taken along the line 29—29 in FIG. 28.

Referring to FIGS. 24, 27–30, provision is made for moving each carriage 131 that supports a wheel 22, 23 in response to change in length of the conveyor chain due to thermal variations, that is, due to the heat to which the chain is exposed. The jack screw 135 connects jack 137 to a housing 138 so that upon operation of the motor M, the housing 138 is moved back and forth through the jack screw 135. The connection to the carriage 131 is by shafts 139, 140 which have one end thereof fixed to the frame 131 and the other end thereof extending through the housing 138 and having cams 141, 142 thereon. Springs 143 are interposed in the interior of the housing act against a collar 144 on each shaft 139, 140 to urge the housing toward the frame 131. Limit switches 145, 146, 147 are adapted to be actuated by the cams 142, 141 as shown in FIG. 28 to control the operation of the motor 135 in accordance with the tension that is placed on the conveyor chain. For example, if the conveyor chain expands reducing the tension thereon, the carriage 131 and, in turn, the shafts 139, 140 will tend to move to the left as viewed in FIG. 29, actuating the limit switch 145 and this will energize the motor to operate the screw 136 and move the housing and, in turn, the carriage 131 to the right to increase the tension on the conveyor chain or take up the slack. This continues until limit switch 146 is actuated to stop the motor. Limit switch 147 is provided to serve as a safety measure in order to prevent excessive tension.

HEAT SHIELDING CONSTRUCTION

Referring to FIG. 12, in the areas of the burner, provision is made for cooling the various parts to prevent the transmission of heat to the operating mechanism. Basically, this comprises providing a heat absorbing cooling panel at various locations to prevent direct impingement of flames on the apparatus. As shown specifically in FIG. 12, the panels are generally hollow sheet metal members 150 which have inlets and outlets through which water or other suitable coolant is circulated. As shown, the panels are mounted in front of the main conveyor as at 150a, 150b beneath the hold down conveyor 81 at 150c, 150d.

OPERATION

In operation, glass articles G are delivered at an entry zone A and moved through the heating zone B by the carriages 35. In the heating zone B, the articles are subjected to flames from the burners 109. During this action, the articles are rotated continuously by engagement of the sprockets 60 with the moving chain 65.

The articles are then moved through the quenching zone C during which they are continuously rotated by the chain 65 and air is applied from plenum 125.

The articles are then carried by the carriages 35 through the cooling zone D where air is applied through plenums 125a, 125b. In this zone, the articles are rotated by engagement with sprockets 60 with the fixed chain 75. Finally, the articles are removed at a delivery or removal zone E. Any broken or defective articles are ejected in the zone F where the carriages are swung downwardly and the carriages are moved adjacent bar 128 and nozzles 127.

We claim:

1. In a glass making machine, the combination comprising

PO-1050
(5/69)

UNITED STATES PATENT OFFICE
CERTIFICATE OF CORRECTION

Patent No. 3,776,348      Dated December 4, 1973

Inventor(s) Louis P. Yakubek, George R. Obenshain

It is certified that error appears in the above-identified patent and that said Letters Patent are hereby corrected as shown below:

Column 7, line 10, "driving" should be --during--.

Column 8, line 17, "135" should be --M--;

line 23, "136" should be --135--.

Column 9, line 13, (Claim 1) "thereof" should be --thereon--.

Column 13, line 33, (Claim 52) "wherein" should be --whereby--.

Signed and sealed this 24th day of September 1974.

(SEAL)
Attest:

McCOY M. GIBSON JR.            C. MARSHALL DANN
Attesting Officer              Commissioner of Patents

50. The combination set forth in claim 49 wherein said last-mentioned means comprises guide bars and associated rollers on said hold down body.

51. The combination set forth in claim 42 including means for guiding said second endless conveyor in overlying relationship to said first carrier.

52. The combination comprising
an endless generally horizontal conveyor having a reach which extends along a predetermined path,
a plurality of work supporting heads pivoted to longitudinally space points on said conveyor for swinging movement about generally horizontal axes generally parallel to the reach,
a support rotatably mounted in said head and having an opening therethrough for receiving an article in a manner such that the article is supported with at least one end thereof exposed for performance of a work function,
means along said path for holding said heads in a manner such that the articles are supported in generally upright position,
means in the area of said last mentioned means along said portion of the path for engaging said support and rotating said support about the axis of the opening therethrough,
a second endless conveyor,
said second carrier having a portion thereof overlying said predetermined path of said first conveyor,
a plurality of longitudinally spaced hold down members,
means for yieldingly mounting each said member in longitudinally spaced relation on said second conveyor wherein in said overlying portion, said hold down members are yieldingly vertically movable for engagement with the closed end of a glass article on said first conveyor.

53. The combination set forth in claim 52 wherein said hold down member comprises a rod vertically reciprocable on said second carrier in said overlying portion,
and means for yieldingly urging said rod downwardly.

54. The combination set forth in claim 52 wherein said second conveyor comprises a plurality of interlinked members,
each said hold down member being mounted on alternate link members.

55. The combination set forth in claim 54 wherein said means for mounting each said hold down member on a link comprises a body,
said hold down member comprising a rod,
spring means interposed between said rod and said body for yieldingly urging said rod away from said second conveyor.

56. The combination set forth in claim 52 wherein said hold down body includes roller bearing means thereon,
and means positioned along said predetermined path for guiding said body while it is in overlying relationship to a portion of said first carrier.

57. In a glass making machine, the combination comprising
an endless conveyor having a reach which extends along a predetermined path,
a plurality of work supporting heads pivoted to longitudinally spaced points on said conveyor for swinging movement about generally horizontal axes generally parallel to the reach,
a support rotatably mounted in said head and having an opening therethrough for receiving a glass article in a manner such that the glass article is supported with at least one end thereof exposed,
means along said path for holding said heads in a manner such that the articles are supported in generally vertical position,
means in the area of said last-mentioned means along said portion of the path for engaging said support and rotating said support about the axis of the opening therethrough,
a second endless conveyor,
said second carrier having a portion thereof overlying said predetermined path of said first conveyor,
a plurality of longitudinally spaced hold members,
means for yieldingly mounting each said member in longitudinally spaced relation on said second conveyor whereby in said overlying portion, said hold down members are yieldingly vertically movable for engagement with the closed end of a glass article on said first conveyor,
said pad comprising a sheet metal member removably mounted on the lower end of said hold member,
and a layer of low friction material on said sheet metal member.

* * * * *

PO-1050
(5/69)

UNITED STATES PATENT OFFICE
CERTIFICATE OF CORRECTION

Patent No.     3,776,348        Dated     December 4, 1973

Inventor(s)   Louis P. Yakubek, George R. Obenshain

It is certified that error appears in the above-identified patent and that said Letters Patent are hereby corrected as shown below:

Column 7, line 10, "driving" should be --during--.

Column 8, line 17, "135" should be --M--;

line 23, "136" should be --135--.

Column 9, line 13, (Claim 1) "thereof" should be --thereon--.

Column 13, line 33, (Claim 52) "wherein" should be --whereby--.

Signed and sealed this 24th day of September 1974.

(SEAL)
Attest:

McCOY M. GIBSON JR.                 C. MARSHALL DANN
Attesting Officer                  Commissioner of Patents